(12) United States Patent
Kawai et al.

(10) Patent No.: US 9,831,751 B2
(45) Date of Patent: Nov. 28, 2017

(54) ARMATURE WITH WINDINGS AND METHOD OF CONNECTING WINDING ENDS OF ARMATURE TO TERMINAL

(71) Applicant: FANUC CORPORATION, Yamanashi (JP)

(72) Inventors: Yasuo Kawai, Yamanashi (JP); Hidetoshi Uematsu, Yamanashi (JP); Masahisa Takekawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/987,556

(22) Filed: Jan. 4, 2016

(65) Prior Publication Data

US 2016/0197528 A1    Jul. 7, 2016

(30) Foreign Application Priority Data

Jan. 6, 2015    (JP) ................. 2015-001033

(51) Int. Cl.
*H02K 3/28*       (2006.01)
*H02K 15/00*      (2006.01)
*H01R 13/46*      (2006.01)

(52) U.S. Cl.
CPC ....... *H02K 15/0075* (2013.01); *H01R 13/465* (2013.01); *H02K 3/28* (2013.01); *H02K 15/0068* (2013.01)

(58) Field of Classification Search
CPC .... H02K 3/28; H02K 15/0068; H01R 13/465; H01R 13/462; H01R 43/20
See application file for complete search history.

(56) References Cited

U.S. PATENT DOCUMENTS

| 4,781,619 | A | * | 11/1988 | Ikeda | .................. | H01R 13/465 29/748 |
|---|---|---|---|---|---|---|
| 6,030,260 | A | * | 2/2000 | Kikuchi | ................. | H01R 39/32 310/71 |
| 8,148,639 | B2 | * | 4/2012 | Auphand | ................. | H01B 7/36 174/110 R |
| 2006/0225909 | A1 | * | 10/2006 | Kurimoto | .............. | H01B 7/365 174/36 |
| 2009/0315419 | A1 | | 12/2009 | Mita et al. | | |
| 2013/0333162 | A1 | * | 12/2013 | Miller | ................. | A47G 1/1666 24/135 R |

(Continued)

FOREIGN PATENT DOCUMENTS

| DE | 3732449 A1 | 4/1989 |
|---|---|---|
| DE | 69107658 T3 | 10/2001 |
| DE | 10202102 A1 | 11/2002 |

(Continued)

*Primary Examiner* — Joshua Benitez-Rosario
*Assistant Examiner* — Leda Pham
(74) *Attorney, Agent, or Firm* — Hauptman Ham, LLP (57) ABSTRACT

The armature of the present invention comprises windings which have ends to be inserted into a tubular terminal, and visually identifiable marks made on the windings to be used for confirming if the ends of the windings have been inserted into the tubular terminal up to a suitable depth. The marks of the armature of the present invention are made on portions of the windings which are always positioned at the outside of the terminal even when the ends of the windings are positioned at the inside of the tubular terminal.

10 Claims, 6 Drawing Sheets

(56) References Cited

U.S. PATENT DOCUMENTS

2015/0229039 A1\* 8/2015 Kawamura .............. H01R 4/20
174/72 A

FOREIGN PATENT DOCUMENTS

| DE | 102006014521 A1 | 10/2008 | |
|---|---|---|---|
| DE | 112012002559 T5 | 3/2014 | |
| EP | 0763879 A1 | 3/1997 | |
| JP | 7-009369 A | 1/1995 | |
| JP | 2010-110168 A | 5/2010 | |
| JP | 2014-187024 A | 10/2014 | |
| WO | WO 2014065307 A1 \* | 5/2014 | .............. H01R 4/20 |

\* cited by examiner

ARMATURE WITH WINDINGS AND METHOD OF CONNECTING WINDING ENDS OF ARMATURE TO TERMINAL

RELATED APPLICATIONS

The present application claims priority to Japanese Application Number 2015-001033, filed Jan. 6, 2015, the disclosure of which is hereby incorporated by reference herein in its entirety.

BACKGROUND OF THE INVENTION

1. Field of the Invention

The present invention relates to an armature with windings and a method of connecting winding ends of an armature to a terminal.

2. Description of the Related Art

The winding ends of an armature such as a stator and rotor are connected to power input parts such as a connector and terminal plate. In general, to connect winding ends to power input parts, soldering, wire crimping, insulation crimping, and other methods are employed. The method of connection using soldering includes a step of inserting stripped winding ends into solder pots of the connector. The method of connection using wire crimping includes a step of inserting stripped winding ends into a crimp terminal, while the method of connection using insulation crimping includes a step of inserting unstripped winding ends into a crimp terminal. Wire crimping or insulation crimping is used to join the winding ends to a crimp terminal, and then the crimp terminal is further connected to a connector or terminal plate.

In relation to this, JP 2010-110168A proposes a method of connecting a winding, which uses a vertical multi-articulated robot to insert winding ends of a motor coil into a tubular crimp terminal. In particular, in the method of connecting a winding of JP 2010-110168A, in order to ensure that the winding ends are reliably inserted into the crimp terminal, a guide member for guiding the winding ends toward an opening part of the crimp terminal needs to be attached to the crimp terminal in advance. Further, JP H07-009369A proposes a manipulator for connecting a conductor which uses a strain gauge to detect insert force acting on a conductor while the conductor is being inserted into an insert opening of the terminal plate, and judge the connected state of the conductor based on the pattern of change of the detected insert force.

Figure 6:
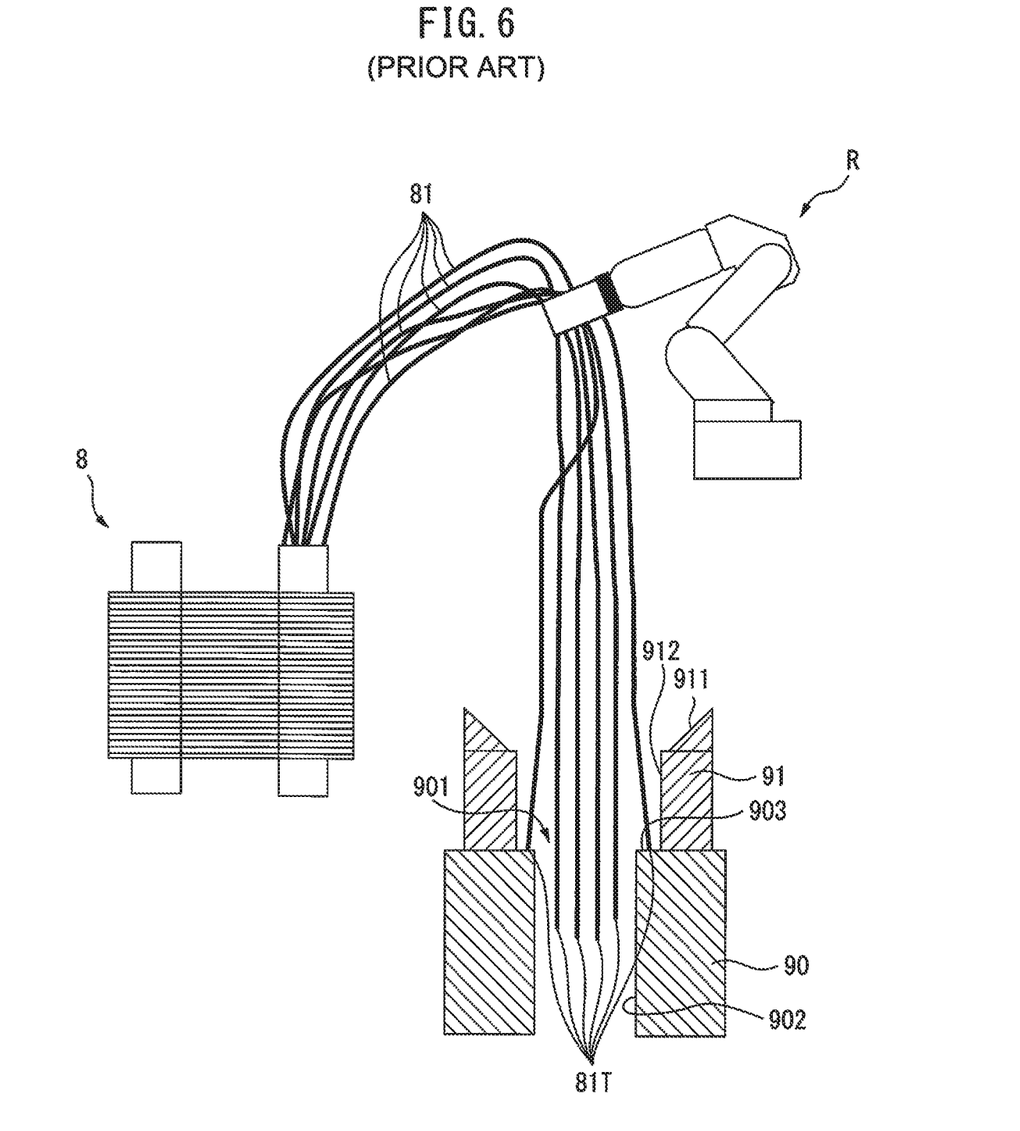
FIG. 6 is a schematic view which shows a conventional winding connecting system which uses a vertical multi-articulated robot to insert winding ends into a crimp terminal.

With respect to the insert depth of the winding ends of an armature into a tubular crimp terminal, it is known that there is an optimal value inherent to each crimp terminal. If the insert depth of the winding ends is insufficient, the connecting parts of the winding ends and the crimp terminal may be abnormally heated during operation of the armature, and is broken due to insufficient strength of the connecting parts. FIG. 6 is a schematic view which shows a conventional winding connecting system which uses a vertical multi-articulated robot to insert winding ends into a crimp terminal. The winding connecting system of FIG. 6 operates a robot R which has a hand which can grip windings 81 of an armature 8 so as to insert winding ends 81T into a tubular crimp terminal 90. The winding connecting system of the present example, like the system of JP 2010-110168A, uses a tubular guide member 91 which guides the winding ends 81T toward an opening part 901 of the crimp terminal 90. As shown in FIG. 6, the crimp terminal 90 and the guide member 91 are connected concentrically. A top surface 911 of the guide member 91 is slanted downward toward in the inside in the radial direction.

For this reason, if the winding ends 81T are inserted into the guide member 91 from above, the top surface 911 and the inner circumferential surface 912 of the guide member 91 guide the winding ends 81T toward the open part 901 of the crimp terminal 90. However, as shown in FIG. 6, if there is an upward facing ring-shaped surface 903 between the inner circumferential surface 912 of the guide member 91 and the inner circumferential surface 902 of the crimp terminal 90, some winding ends 81T may abut against the ring-shaped surface 903 and be stopped. In this case, even if a user tries to confirm whether the winding ends 81T have been inserted into the crimp terminal 90 up to a suitable depth during visual checking or using a visual sensor, it is difficult for the user to accurately identify the positions of the winding ends 81T which have been inserted into the crimp terminal 90 or the guide member 91.

An armature which enables confirmation of whether winding ends have been inserted into a tubular terminal up to a suitable depth has been sought.

SUMMARY OF INVENTION

According to a first aspect of the present invention, there is provided an armature comprising windings which have ends to be inserted into a tubular terminal, and visually identifiable marks which are made on the windings and used for confirming if the ends have been inserted into the terminal to a suitable depth wherein, the marks are made on portions of the windings which are always positioned at the outside of the terminal even when the ends are positioned at the inside of the terminal.

According to a second aspect of the present invention, there is provided an armature according to the first aspect, wherein the marks are made of paint which is applied to the coverings of the windings and has a different color from the coverings.

According to a third aspect of the present invention, there is provided an armature according to the first or second aspect, wherein the terminal comprises a tubular terminal body which is electrically connected to a source of power supply to the windings, and a tubular guide member which is connected to the terminal body and has an insert opening through which the ends are inserted, and the guide member has a guide surface which guides the ends toward the terminal body when the ends are inserted into the insert opening.

According to a fourth aspect of the present invention, there is provided a method of connecting ends of the windings of the armature according to any one of the first to third aspects, to the terminal, comprising: positioning the ends above an insert opening of the terminal, inserting the ends through the insert opening of the terminal into the terminal, and comparing actual positions of the marks and a predetermined target position which is located above the insert opening of the terminal.

According to a fifth aspect of the present invention, there is provided a method according to the fourth aspect, further comprising using a robot to insert the ends through the insert opening of the terminal into the inside of the terminal.

According to a sixth aspect of the present invention, there is provided a method according to the fifth aspect further comprising using a visual sensor to compare the actual positions of the marks and the target position.

These and other objects, features, and advantages of the present invention will become clearer with reference to the detailed description of an illustrative embodiment of the present invention which is shown in the mounted drawings.

DETAILED DESCRIPTION OF EMBODIMENT

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Figure 1:
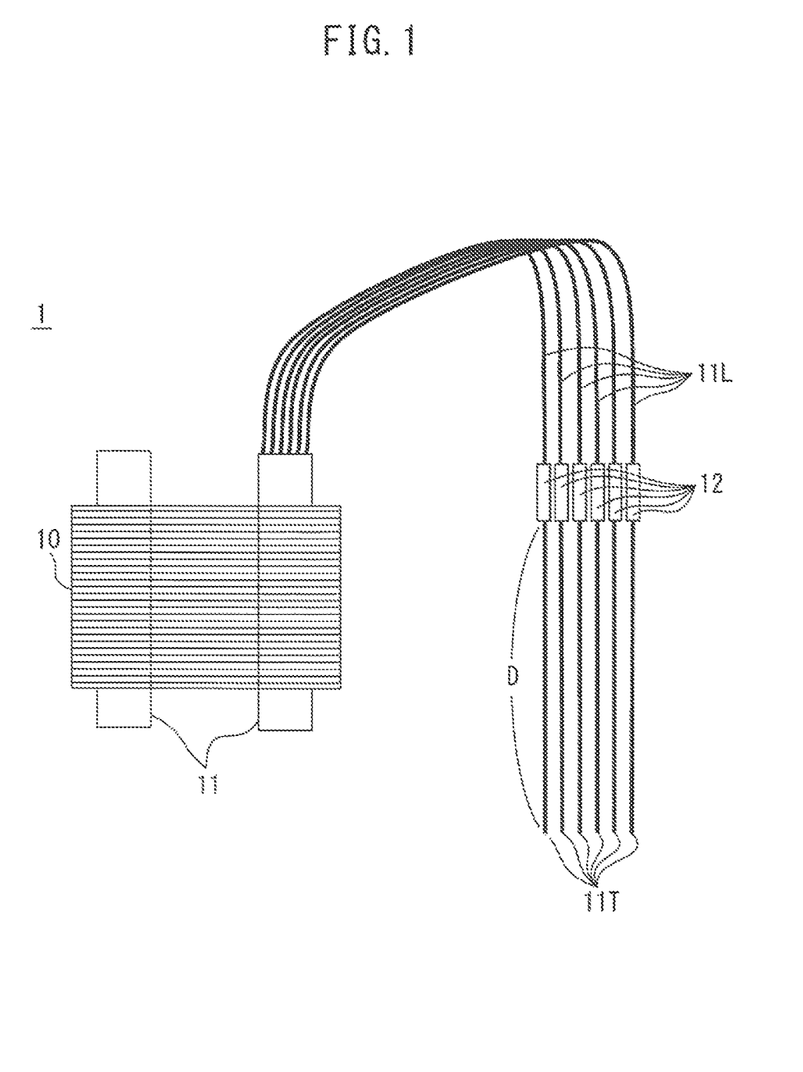
FIG. 1 is a side view which shows an armature of one embodiment of the present invention.
Figure 2:
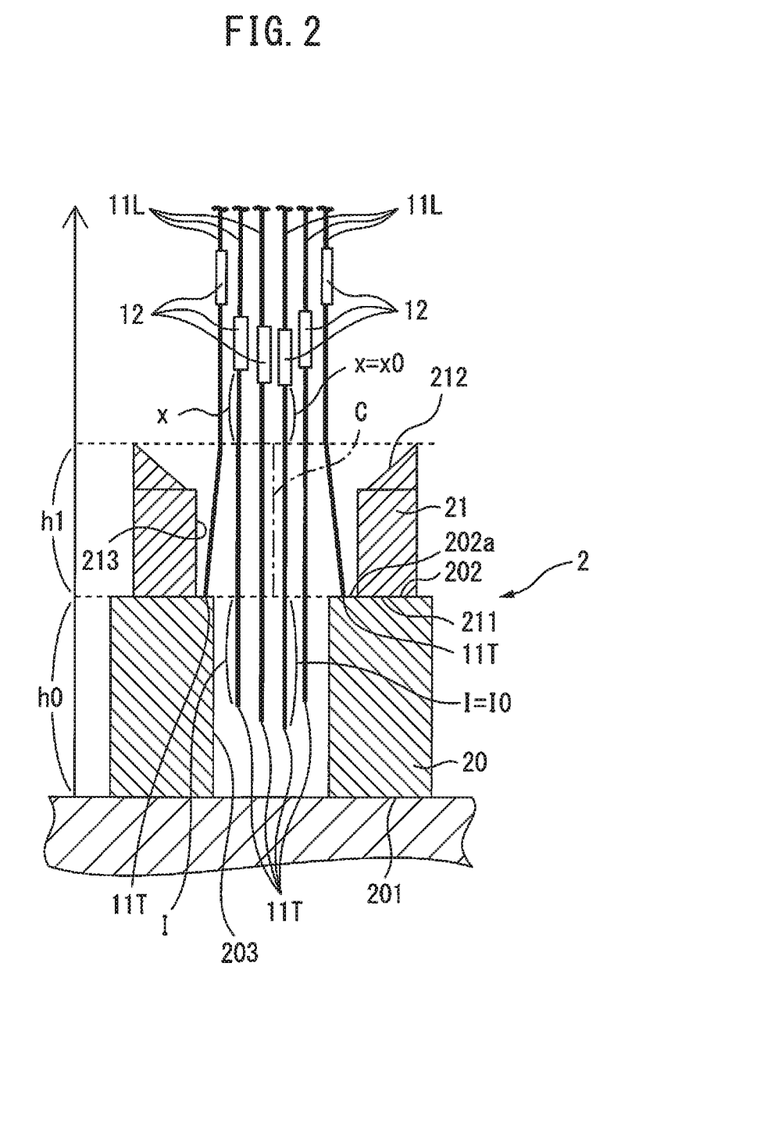
FIG. 2 is a partial enlarged view which shows ends of a plurality of leads and their vicinities in FIG. 1.

Referring to FIG. 1 to FIG. 2, the armature of one embodiment of the present invention will be explained. FIG. 1 is a side view which shows an illustrative armature 1 of the present embodiment. As shown in FIG. 1, the armature 1 of the present example is a stator of various types of motors and is provided with a tubular stator core 10 and a plurality of windings 11 which are wound around the stator core 10. The stator core 10 of the present example is formed by stacking a plurality of electrical steel sheets. Further, the inner circumferential surface of the stator core 10 of the present example is provided with a plurality of slots (not shown) which extend in the axial direction. These slots are arranged at equal intervals in the circumferential direction. At the insides of these slots, wound parts of a plurality of windings 11 are held.

Continuing to refer to FIG. 1, the parts of the windings 11 which are led out from the stator core 10 have ends 11T which are inserted into the tubular terminal 2. The terminal 2 into which the ends 11T are inserted will be explained later. In the following explanation, the parts of the windings 11 which are led out from the stator core 10 will sometimes particularly be referred to as the "leads 11L". As shown in FIG. 1, the armature 1 of the present example is provided with visually identifiable marks 12 which are attached to the individual leads 11L. The "visually identifiable" referred to herein means the ability to be recognized visually differentiated from other parts. Accordingly, a user can visually identify the positions of the marks 12 on the leads 11L. Further, when the marks 12 of the present example are included in the various images captured by the camera, it is possible to analyze the images captured by the camera so as to obtain position information of the marks 12.

The marks 12 are made of paint which is applied to the coverings of the leads 11L. To improve the visibility of the marks 12, the color of the paint of the marks 12 is preferably a different color from the covering of the leads 11L. To further improve the visibility of the marks 12, the marks 12 may be suitably changed in hue, lightness, saturation, etc. The marks 12 of the present example can be formed by applying paint to the surface of a rod-shaped marking member and pushing the marking member against the coverings of the leads 11L. It is therefore possible to attach the marks 12 simultaneously to the plurality of leads 11L. Alternatively, the marks 12 of the present example may be formed by preparing a spray device which can spray paint and making it move with respect to the leads 11L.

As shown in FIG. 1, each of the marks 12 has a predetermined dimension along the extension direction of the lead 11L. Further, the marks 12 of the plurality of leads 11L are attached to locations separated from the ends 11T of these leads 11L by a common length D. The marks 12 in the above forms are used for visually confirming whether the ends 11T of the leads 11L are inserted into the tubular terminal 2 up to a suitable depth. This point will be explained with reference to FIG. 2. FIG. 2 is a partially enlarged view which shows the ends 11T of the plurality of leads 11L and their vicinities in FIG. 1. In the example of FIG. 2, the ends 11T of the plurality of leads 11L are inserted inside the tubular terminal 2. Note that, in the example of FIG. 2, predetermined locations of the plurality of leads 11L which are positioned on the opposite sides of the ends 11T across the marks 12 are held together by a special gripping device (not shown). Further, the sections of the leads 11L between the marks 12 and the ends 11T are held parallel with respect to the vertical direction so long as not contacting any obstructions (see FIG. 2, second to fifth leads 11L from the left).

Here, the terminal 2 in which the ends of the plurality of leads 11L are inserted will be explained. FIG. 2 shows a longitudinal cross-section of the terminal 2 of the present example. As shown in FIG. 2, the terminal 2 of the present example has an overall tubular shape and is placed on a horizontal surface of a table so that its height direction becomes parallel to the vertical direction. Further, the terminal 2 of the present example comprises a tubular terminal body 20 which is electrically connected to a source of power supply to the windings 11, and a tubular guide member 21 which is detachably connected to the terminal body 20. As shown in FIG. 2, the terminal body 20 and the guide member 21 of the present example are connected concentrically. The terminal body 20 of the present example is a general crimp terminal and has a bottom surface 201 which is placed on a table and a top surface 202 which is connected to a bottom surface 211 of the guide member 21. After the ends 11T of the plurality of leads 11L are inserted inside the terminal body 20, the terminal body 20 of the present example is pinched by a special crimping tool inward in the radial direction to be plastically deformed. Due to this, the front end parts of the leads 11L including the ends 11T are pinched inward from the inner circumferential surface 203 of the terminal body 20, and therefore the ends 11T are crimped to the inner circumferential surface 203 of the terminal body 20.

Further, the guide member 21 of the present example has a bottom surface 211 which is connected to a top surface 202 of the terminal body 20 and a top surface 212 which is slanted downward toward a centerline C of the tubular body. Note that, the guide member 21 of the present example can comprise two parts which are arranged on the opposite sides of a plane passing through the centerline C of the tubular body, and these parts can be separated from each other. Therefore, the guide member 21 of the present example can be detached from the terminal body 20 after the ends 11T of the leads 11L have been crimped to the terminal body 20. Alternatively, the guide member 21 of the present example can have a C-shaped lateral cross-section including a notched part which enables detachment from the terminal body 20 without interference with the plurality of leads 11L. The opening part of the top surface 212 of the guide member 21 performs the role of an insertion hole through which the ends 11T of the leads 11L are inserted. Further, the top surface 212 and the inner circumferential surface 213 of the guide member 21 form a continuous guide surface which guides the ends 11T of the leads 11L while the leads 11L are inserted into the above insert opening toward the opening part of the top surface 202 of the terminal body 20. As shown in FIG. 2, if the inside diameter of the guide member 21 is smaller than the inside diameter of the terminal body 20, an upward facing ring-shaped surface 202a is formed at the transition part of the inner circumferential surface 213 of the guide member 21 and the inner circumferential surface 203 of the terminal body 20.

In this regard, it is known that for the insert depth of the winding ends of an armature to be inserted into a tubular crimp terminal, there is an optimal value inherent to each crimp terminal. If the actual insert depth of the winding ends greatly differs from the optimum value, the connecting parts of the winding ends and the crimp terminal will abnormally generate heat or the connecting parts of the winding ends and the crimp terminal will be liable to break due to insufficient strength. Therefore, in the armature 1 of the present embodiment, the above marks 12 which are attached to the leads 11L are used to confirm if the optimum value I0 of the insert depth I into the terminal body 20 has been reached. Here, the "insert depth I into the terminal body 20" is the distance from the top surface 202 of the terminal body 20 to the ends 11T (see FIG. 2, second lead 11L from the left). In the armature 1 of the present example, the insert depth I of the fourth lead 11L from the left in FIG. 2 has become equal to the preset optimum value I0. Referring to FIG. 1 and FIG. 2, in the armature 1 of the present example, the distance D of the sections of the leads 11L between the marks 12 and the ends 11T is made larger than the sum of the height h0 of the terminal body 20 and the height H1 of the guide member 21 (that is, D>h0+h1). Therefore, even while the ends 11T of the leads 11L are positioned inside the terminal 2, the marks 12 of the leads 11L are always exposed to the outside of the terminal 2. Due to this, a user can visually identify the positions of the marks 12 of the leads 11L.

More specifically, in the armature 1 of the present example, the length D of the above sections of the leads 11L becomes equal to the total value of the sum of the optimum value I0 of the insert depth I and height h1 of the guide member 21 (I0+h1) plus a further desired distance value x0 (that is, D=I0+h1+x0). Therefore, when the distance x from the top end of the guide member 21 to the marks 12 is equal to the above distance value x0, it means the optimum value I0 of the insert depth I is reached. That is, a user can compare the distance x from the top end of the guide member 21 to the individual marks 12 with the predetermined distance value x0, and thereby visually confirm whether the ends 11T have been inserted into the terminal body 20 up to a suitable depth. In particular, if the distance x from the guide member 21 to the marks 12 is substantially equal to the predetermined distance value x0, the user may judge that the ends 11T have been inserted up to the suitable depth. On the other hand, if the distance x from the guide member 21 to the marks 12 greatly differs from the predetermined distance x0, the user may judge that the ends 11T have not been inserted up to the suitable depth. Note that, the step of inserting the leads 11L into the terminal 2 may be performed by a vertical multi-articulated robot or other automation device or may be manually performed by a user.

Figure 3:
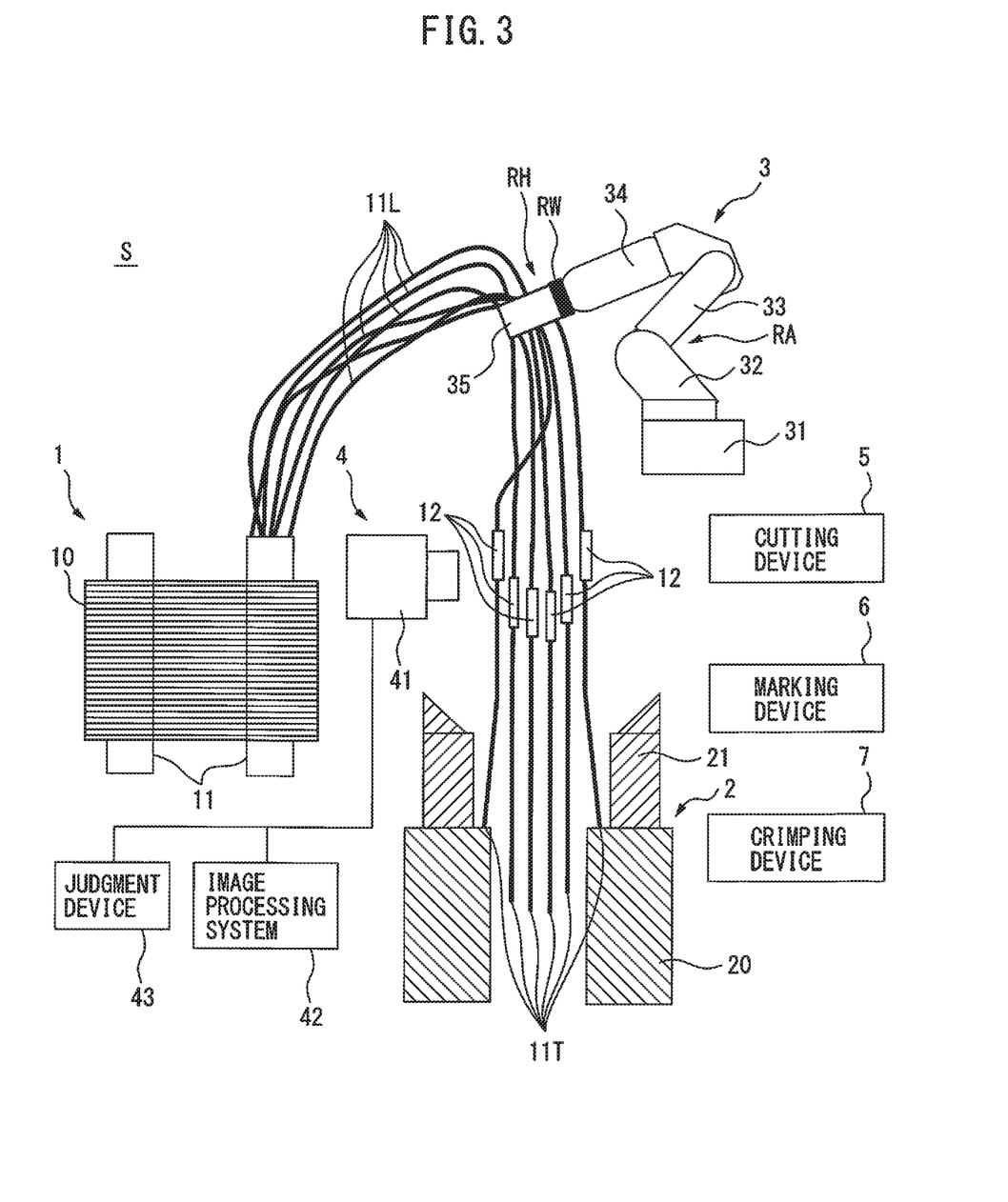
FIG. 3 is a schematic view which shows a terminal connecting system the function of confirming if the ends of the plurality of leads in FIG. 1 have been inserted in the terminal body up to a suitable depth.

In the above explanation, the user visually identifies the positions of the marks 12 to confirm whether the ends 11T have been inserted in the terminal body 20 up to a suitable depth. In this regard, according to the present invention, it is possible to realize an automation system which is provided with the function of confirming whether the ends 11T of the plurality of leads 11L in FIG. 1 have been inserted into the terminal body 20 up to a suitable depth. FIG. 3 is a schematic view which shows an illustrative terminal connecting system S which is provided with the above confirmation function. As shown in FIG. 3, the terminal connecting system S of the present example includes a winding insert device 3 which inserts the ends 11T of the plurality of leads 11L into the terminal 2, and a visual sensor 4 which confirms whether the ends 11T of the plurality of leads 11L have been suitably inserted into the terminal 2. These devices will be explained in detail below.

First, the winding insert device 3 of FIG. 3 will be explained. As shown in FIG. 3, the winding insert device 3 of the present example is a vertical multi-articulated robot which has an arm RA which has a wrist part RW at its front end and a hand RH which is attached to the wrist part RW. Here, the arm RA of the present example has a stationary base part 31 which is fastened to the floor surface, a swiveling type movable base part 32 which is connected to the stationary base part 31, a swiveling type bottom arm part 33 which is connected to the movable base part 32, a swiveling type top arm part 34 which is connected to the bottom arm part 33, and a swiveling type wrist part RW which is connected to the top arm part 34. Further, the arm RA of the present example can use the drive force of a servo motor or other drive device (not shown) to change the position and posture of the hand RH which is attached to the wrist part RW. Further, the hand RH of the present example has finger parts 35 which can grip together the plurality of leads 11L and a servo motor or other drive device (not shown) which drives the finger parts 35.

Figure 4:
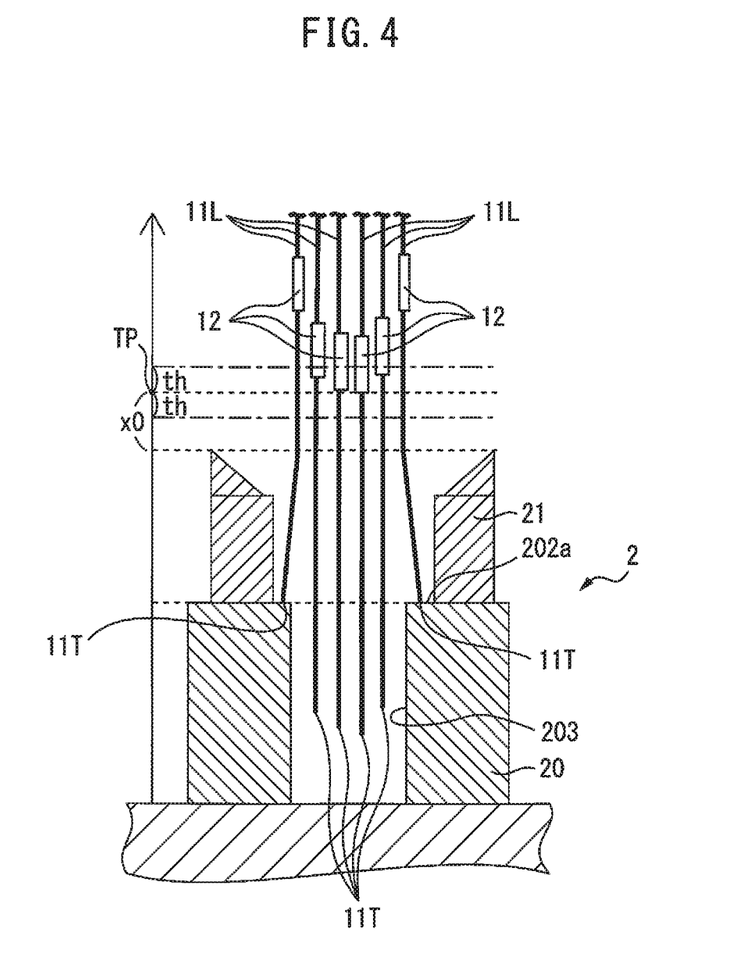
FIG. 4 is a schematic view which shows the positional relationship between a plurality of ends of windings and a terminal after an illustrated winding insertion step has been completed.

The winding insert device 3 which has the above structure executes a step of using the finger parts 35 of the hand RH to grip together the plurality of leads 11L, a step of moving the hand RH in the horizontal direction so that the ends 11T of the plurality of leads 11L are positioned above the terminal 2, and a step of moving the hand RH downward in the vertical direction so as to insert the ends 11T of the plurality of leads 11L inside the terminal 2. The step of inserting the ends 11T into the terminal 2 will sometimes be called the "winding insert step" below. FIG. 4 is a schematic view which shows the positional relationship of the ends 11T and the terminal 2 after an illustrative winding insert step has been completed. In the winding insert step of the present example, the winding insert device 3 moves the hand RH in the vertical direction so that the bottom ends of the individual marks 12 approach the predetermined target position TP in the vertical direction. The target position TP is a position spaced from the guide member 21 of the terminal 2 in the vertical direction by the above distance value x0. That is, the optimum value I0 of the insert depth I to the terminal body 20 is reached when the positions of the bottom ends of the marks 12 become equal to the target position TP.

Next, the visual sensor 4 of FIG. 3 will be explained. As shown in FIG. 3, the visual sensor 4 of the present example comprises a camera 41 which is fastened to a floor surface so as to capture the space above a terminal 2 which is placed on a carrying table, an image processing system 42 which analyzes an image captured by the camera 41, and a judgment device 43 which executes predetermined judgment processing corresponding to the results of analysis of the image processing system 42. The camera 41 of the present example is a digital camera which is provided with a CCD (charge coupled device) image sensor or CMOS (complementary metal-oxide semiconductor) image sensor or other camera device. The capturing face of the camera 41 is made substantially parallel to the vertical direction, and therefore the camera 41 can capture an image including marks of a plurality of leads 11L during the winding insert step. The image captured by the camera 41 is sent to the image processing system 42.

Next, the image processing system 42 of the present example analyzes the image captured by the camera 41 to detect the actual positions of the marks 12 of the leads 11. More specifically, the image processing system 42 of the present example detects the positions of the bottom ends of the marks 12 in the vertical direction. The positions of the marks 12 which the image processing system 42 detects will sometimes be referred to below as the "detected positions" of the marks 12. Next, the judgment device 43 of the present example judges if the amounts of deviation of the detected positions of the marks 12 from the target position TP are a predetermined threshold value th or less. That is, the judgment device 43 of the present example judges if the detected positions of the marks 12 are within a predetermined allowable range. The region in FIG. 4 located between the two broken lines corresponds to such an allowable range. In the example of FIG. 4, the second to fifth marks 12 from the left are in the allowable range, but the left end and right end marks 12 are not in the allowable range. Further, the winding connecting system S of the present example judges that a lead 11L has been inserted into the terminal body 20 up to the suitable depth if the detected position of the mark 12 of that lead 11L is in the allowable range. On the other hand, the winding connecting system S of the present example judges that a lead 11L has not been inserted into the terminal body 20 up to the suitable depth if the detected position of the mark 12 of the lead 11L is not in the allowable range.

Referring again to FIG. 3, the winding connecting system S of the present example further includes a cutting device 5 which cuts the plurality of leads 11L, a marking device 6 which makes marks 12 on the plurality of leads 11L, and a crimping device 7 which crimps ends 11T of the plurality of leads 11L to the terminal body 20. The cutting device 5 of the present example is provided with various types of cutters (not shown) and is configured to simultaneously cut the plurality of leads 11L which are gripped by the hand RH. If the cutting device 5 cuts the plurality of leads 11L, ends 11T of these leads 11L are formed. Further, the marking device 6 of the present example is provided with rod-shaped marking member (not shown) and is configured to apply paint to the surface of the marking member and to push the marking member against the plurality of leads 11L. If the marking device 6 pushes the marking member against the plurality of leads 11L, these leads 11L are given the marks 12 simultaneously. Further, the crimping device 7 of the present example is provided with various types of crimping tools (not shown) and is configured so that the crimping tool pinches the terminal body 20 inward in the radial direction. If the crimping device 7 pinches the terminal body 20, the terminal body 20 is plastically deformed, and therefore the ends 11T are crimped to the inner circumferential surface 203 of the terminal body 20.

Figure 5:
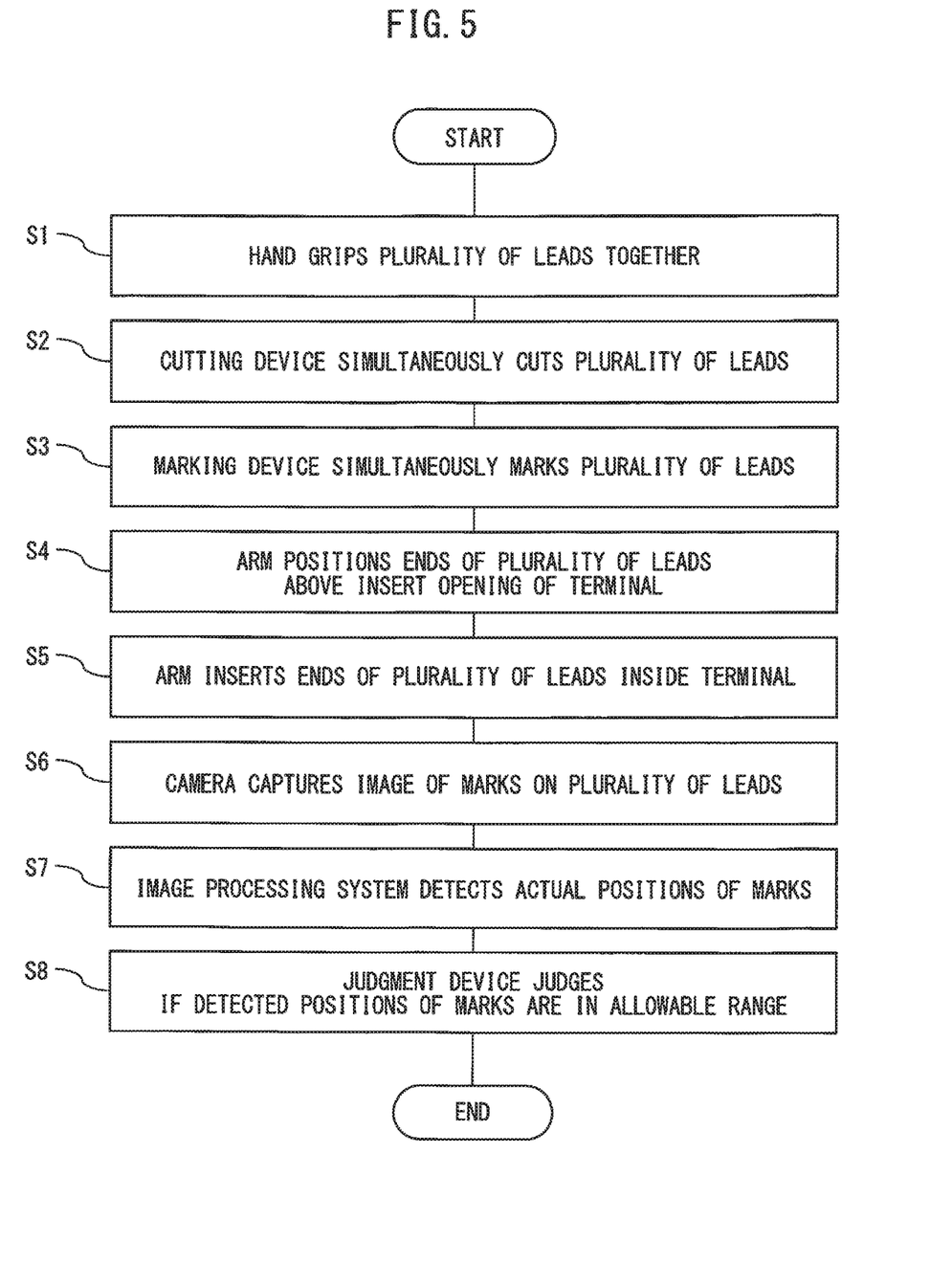
FIG. 5 is a flow chart which shows a routine of processing in which the winding connecting system of FIG. 3 connects a plurality of ends of windings to a terminal.

Next, the operation of the winding connecting system S of FIG. 3 will be explained in brief. FIG. 5 is a flow chart which shows a routine of processing whereby the winding connecting system of FIG. 3 connects ends 11T of the plurality of windings 11L to the terminal 2. Note that, at the point of time when the processing of FIG. 5 is started, a semi-finished product of the armature 1 which has only a stator core 10 and windings 11 which have been wound around the stator core 10 is prepared. That is, at the point of time when the processing of FIG. 5 is started, the above marks 12 have not yet been made on the leads 11L.

As shown in FIG. 5, at step S1, the hand RH of the winding insert device 3 grips together the plurality of leads 11L. The parts of the leads 11L which are gripped by the hand RH will sometimes be referred to below as the "gripped parts". Next, at step S2, the cutting device 5 simultaneously cuts the plurality of leads 11L which are gripped by the hand RH. The cutting locations of the leads 11L at step S2 are predetermined locations between the gripped parts and front end parts of the leads 11L. Due to this, the plurality of leads 11L will have ends 11T at locations spaced from the gripped parts by a common distance. Next, at step S3, the marking device 6 simultaneously makes marks 12 on the plurality of leads 11L which are held by the hand RH. More specifically, the marking device 6 applies paint to the surface of a rod-shaped marking member which extends in the horizontal direction and pushes the marking member against the plurality of leads 11L. Due to this, the plurality of leads 11L will have marks 12 at locations spaced from the ends 11T by a common distance.

Next, at step S4, the arm RA of the winding insert device 3 moves the hand RH in the horizontal direction so that the ends 11T of the plurality of leads 11L are positioned above the insert opening of the terminal 2. Next, at step S5, the arm RA of the winding insert device 3 moves the hand RH downward in the vertical direction so that the ends 11T of the plurality of leads 11L are inserted inside the terminal 2. The arm RA of the winding insert device 3 moves the hand RH downward in the vertical direction so that the bottom ends of the marks 12 approach the predetermined target position TP (see FIG. 4). Next, at step S6, the camera 41 of the visual sensor 4 captures an image of the marks of the plurality of leads 11L. Next, at step S7, the image processing system 42 of the visual sensor 4 analyzes the image captured by the camera 41 to thereby detect the actual positions of the marks 12.

Next, at step S8, the judgment device 43 of the visual sensor 4 judges if the detected positions of the marks 1 are present within a predetermined allowable range (see FIG. 4). In this way, the winding connecting system S of the present example confirms whether the ends 11T of the leads 11L have been inserted into the terminal body 20 up to a suitable depth. That is, the winding connecting system S of the present example judges that all of the ends 11T of the leads 11 have been inserted into the terminal body 20 up to a suitable depth when the detected positions of all of the marks 12 are within the allowable range. On the other hand, the winding connecting system S of the present example judges that the ends 11T of the leads 11L have not been inserted into the terminal body 20 up to a suitable depth when the detected position of any of the marks 12 is not in the allowable range. In this case, there is a high possibility that the end 11T of the lead 11L remains at the outside of the terminal body 20. In particular, there is a high possibility that the end 11T of the lead 11L has abutted against the ring-shaped surface 202a of the terminal body 20 to be stopped by the ring-shaped surface 202a (see FIG. 4). After that, the winding connecting system S notifies the user of the results of judgment of step S8 if necessary, then ends the series of processing.

As explained above, according to the armature 1 of the present embodiment, by comparing the actual positions of the marks 12 and predetermined target position TP which is located at the outside of the terminal 2, it is possible to confirm if the ends 11T of the windings 11 have been inserted in the terminal 2 up to a suitable depth. Therefore, according to the armature 1 of the present embodiment, it is possible to prevent the connecting parts of the ends 11T and the terminal 2 from being abnormally heated or broken during operation of the armature 1, due to an insufficient insertion depth of the ends 11T. In particular, if using the above winding insert device 3 (vertical multi-articulated robot) for inserting the ends 11T of the windings 11 into the terminal 2, it is possible to accurately match the actual positions of the marks 12 of the windings 11 with predetermined target position TP, and therefore it is possible to guarantee a suitable insert depth of the ends 11T. Further, if the above visual sensor 4 is used for comparing the actual positions of the marks 13 of the windings 11 and target position TP, it is possible to automate the step of confirming if the ends 11T of the winding 11 have been inserted into the terminal 2 up to a suitable depth.

Effect of Invention

According to the first and fourth aspects of the present invention, by comparing the actual positions of the marks and predetermined target position which is located at the outside of the terminal, it is possible to confirm if the ends of the windings have been inserted into the terminal up to a suitable depth. Therefore, according to the first and fourth aspects, it is possible to prevent the connecting parts of the winding ends and the terminal from being abnormally heated or broken during operation of the armature due to an insufficient insert depth of the ends of the windings.

According to the second aspect of the present invention, it is possible to improve the visibility of the marks of the windings, and therefore possible to easily confirm if the ends of the windings have been inserted into the terminal up to a suitable depth.

According to the third aspect of the present invention, when the ends of the windings are inserted into the insert opening of the guide member, the ends of the windings are guided by the guide surface toward the terminal body, and therefore it is possible to easily insert the ends of the windings into the terminal body.

According to the fifth aspect of the present invention, a robot is used for inserting the ends of the windings into the terminal, and therefore it is possible to accurately match the actual positions of the marks of the windings with predetermined preset target position. Therefore, according to the fifth aspect, it is possible to guarantee a suitable insert depth of the ends of the windings.

According to the sixth aspect of the present invention, a visual sensor is used to compare the actual positions of the marks of the windings and the target position, and therefore it is possible to automate the step of confirming if the ends of the windings have been inserted into the terminal up to a suitable depth.

The present invention is not limited to only the above embodiment and can be modified in various ways within the scope which is described in the claims. For example, the marks 12 are formed by applying paint to the coverings of the windings 11, but the marks of the windings in the armature of the present invention may also be formed by bending parts of the windings so that those parts are plastically deformed. The thus formed marks have shapes different from other parts of the winding and, in the same way as the marks 12, can be recognized visually differentiated from other parts. Further, the armature 1 is a stator of a motor, but the armature of the present invention may be any component of a rotary electrical component which has windings and a core. Accordingly, the armature of the present invention may also be a rotor of a motor. Furthermore, the dimensions, shapes, materials, etc. of the parts of the armature 1 which are described in the above embodiments are only an example. Various dimensions, shapes, materials, etc. can be employed to achieve the effects of the present invention. Similarly, the functions and configurations of the various devices in the winding connecting system S which is described in the above embodiment are only examples. Various functions and configurations can be employed so as to realize the effects of the present invention.

The invention claimed is:

1. An armature comprising:
windings which have ends to be inserted into a tubular terminal, and
visually identifiable marks which are made on said windings and used for confirming if said ends have been inserted into said terminal to a suitable depth,
wherein
said marks are made on portions of said windings and are configured to be always positioned at the outside of said terminal even when said ends are positioned at the inside of said terminal, and
positions of said marks on said windings satisfy a relationship of $$D = I0 + h1 + x0,$$

where
D is a length of a lead of each of the windings from the mark on said winding to the end of said winding,
I0 is the suitable depth at which the ends of the windings are inserted into the terminal,
h1 is a height of a tubular guide member which is detachably connected to a top surface of the tubular terminal and through which the ends of the windings are to be inserted into the terminal, and
x0 is a predetermined distance value of a distance x from a top end of the guide member to the mark on each of the windings.

2. The armature according to claim 1, wherein
said marks are made of paint,
the paint is applied to coverings of said windings and has a different color from said coverings.

3. The armature according to claim 1, wherein
said terminal comprises a tubular terminal body and a tubular guide member,
said terminal body is electrically connected to a source of power supply to said windings,
said tubular guide member is connected to said terminal body and has an insert opening through which said ends are inserted, and
said guide member has a guide surface configured to guide said ends toward said terminal body when said ends are inserted into said insert opening.

4. The armature according to claim 1, wherein
the tubular terminal is a crimp terminal which is, upon being pinched by a crimping tool, plastically deformable inward in a radial direction to cause the ends of the windings to be crimped to an inner circumferential surface of the crimp terminal.

5. The armature according to claim 1, wherein $$D > h0 + h1,$$

where h0 is a height of the terminal.

6. A method of connecting ends of windings of an armature into a tubular terminal,
the armature comprising:
   the windings which have the ends to be inserted into the tubular terminal, and
   visually identifiable marks which are made on said windings and used for confirming if said ends have been inserted into said terminal to a suitable depth, wherein
   said marks are made on portions of said windings and are always positioned at the outside of said terminal even when said ends are positioned at the inside of said terminal,
said method comprising:
   positioning said ends above an insert opening of said terminal,
   inserting said ends through the insert opening of said terminal into said terminal,
   comparing actual positions of said marks and a predetermined target position which is located above said insert opening of said terminal, and
   detachably connecting a tubular guide member to a top surface of the tubular terminal,
wherein
said inserting comprises inserting the ends of the windings through the tubular guide member and then through the insert opening of the terminal into the terminal, and
said comparing comprises comparing (i) a distance x from a top end of the guide member to the mark on each of the windings with (ii) a predetermined distance value x0 that satisfies a relationship of $$D = I0 + h1 + x0,$$

where
D is a length of a lead of each of the windings from the mark on said winding to the end of said winding,
I0 is the suitable depth at which the ends of the windings are inserted into the terminal, and
h1 is a height of the guide member.

7. The method according to claim 6, further comprising:
using a robot to insert said ends through said insert opening of the terminal into said terminal.

8. The method according to claim 7, further comprising:
using a visual sensor to compare said actual positions of the marks and said target position.

9. The method according to claim 6, wherein
the tubular terminal is a crimp terminal, and
said method further comprises, after said inserting,
   pinching, by a crimping tool, the crimp terminal inward in a radial direction to cause the crimp terminal to be plastically deformed and the ends of the windings to be crimped to an inner circumferential surface of the crimp terminal.

10. The method according to claim 6, wherein $$D > h0 + h1,$$

where h0 is a height of the terminal.

* * * * *